United States Patent
Sung et al.

(10) Patent No.: US 7,744,070 B2
(45) Date of Patent: Jun. 29, 2010

(54) EXTERNAL GAS HUMIDIFIER FOR FUEL CELL

(75) Inventors: Lung-Yu Sung, Hsinchu (TW); Jar-Lu Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 859 days.

(21) Appl. No.: 11/642,936

(22) Filed: Dec. 21, 2006

(65) Prior Publication Data

US 2007/0257384 A1    Nov. 8, 2007

(30) Foreign Application Priority Data

May 4, 2006    (TW) ............................... 95115820 A

(51) Int. Cl.
*B01F 3/04* (2006.01)
(52) U.S. Cl. ............. 261/153; 261/156; 261/157; 261/161; 261/79.2; 261/122.1; 261/123
(58) Field of Classification Search .............. 261/77, 261/79.2, 104, 119.1, 123, 122.1, 122.2, 261/131, 135, 141, 153, 156, 157, 161
See application file for complete search history.

(56) References Cited

U.S. PATENT DOCUMENTS

| | | | | |
|---|---|---|---|---|
| 193,397 A | * | 7/1877 | Cosh ........................ 261/123 |
| 240,320 A | * | 4/1881 | Mallinckrodt ............... 96/346 |
| 721,723 A | * | 3/1903 | Murphy ................... 261/122.1 |
| 793,786 A | * | 7/1905 | Helmle .................... 261/122.1 |
| 852,543 A | * | 5/1907 | Deckebach ................. 96/120 |
| 934,367 A | * | 9/1909 | Steel, Jr. .................... 261/124 |
| 1,082,865 A | * | 12/1913 | Goodyear ................... 261/161 |
| 1,627,713 A | * | 5/1927 | Seymour ..................... 62/305 |
| 1,839,234 A | * | 1/1932 | Lehn ......................... 261/153 |
| 2,405,494 A | * | 8/1946 | Dupuy ....................... 96/340 |
| 3,967,940 A | * | 7/1976 | Hirano et al. ................. 96/52 |
| 4,085,170 A | * | 4/1978 | Simpson et al. ................ 261/1 |
| 5,513,722 A | * | 5/1996 | Foltz ......................... 184/55.2 |

\* cited by examiner

*Primary Examiner*—Scott Bushey
(74) *Attorney, Agent, or Firm*—Birch, Stewart, Kolasch & Birch, LLP

(57) ABSTRACT

An external gas humidifier for fuel cell transfers recycled high-temperature waste heat produced by the fuel cell to a reactant gas, such as hydrogen or air, which is guided into the external gas humidifier. The heated reactant gas is treated in the external gas humidifier to effectively increase the moisture content of the reactant gas within a shortened time. When the humidified reactant gas enters into the fuel cell, it enables a polymeric membrane in the fuel cell to be well humidified to thereby enhance the power generation efficiency and service life of the fuel cell.

8 Claims, 1 Drawing Sheet

EXTERNAL GAS HUMIDIFIER FOR FUEL CELL

FIELD OF THE INVENTION

The present invention relates to a gas humidifier for a proton exchange membrane fuel cell, and more particularly to an external gas humidifier for fuel cell that utilizes recycled high-temperature waste heat produced by the fuel cell to heat a reactant gas and humidifies the heated reactant gas for the same to have an increased moisture content within a shortened time.

BACKGROUND OF THE INVENTION

A proton exchange membrane fuel cell (PEMFC) is a device which directly uses hydrogen ($H_2$) and oxygen ($O_2$) in an electrochemical reaction to generate electricity. The PEMFC has low operating temperature, short turn-on time, high energy density, low pollution, and wide applications, and is therefore a technique widely researched and promoted all over the world.

A typical PEMFC mainly consists of a proton exchange membrane (PEM), a catalyst layer, a gas diffusion layer (GDL), and a bipolar plate. The proton exchange membrane (PEM) is a solid-state polymeric membrane, such as Nafion® membranes from DuPont®, Aciplex® membranes from Asashi Chemical, BAM® (Ballard Advanced Material) membranes from Ballard, and Gore-Select® membranes from Gore. The PEM is used in a PEMFC mainly to isolate the reactant gas at the cathode from that at the anode, and to isolate electrons. The PEM conducts only water molecules ($H_2O$) and hydrogen ions ($H^+$). Therefore, this type of polymeric membrane is a gas impermeable membrane, which conducts hydrogen ions ($H^+$) but not electrons ($e^-$). When the hydrogen ions ($H^+$) are conducted via this type of polymeric membrane, they must be carried by water molecules. Therefore, the higher the moisture content of the polymeric membrane is, the better the hydrogen ions ($H^+$) conducting is. Thus, it is important to increase the moisture content of the polymeric membrane to obtain better hydrogen ions ($H^+$) conducting, and accordingly, to maintain the PEMFC in good performance.

The methods and designs for humidifying a reactant gas for the fuel cell may be generally divided into two types, namely, internal and external humidification, that have their respective advantages and drawbacks. Regarding the external humidification, an external humidifier has to be provided outside the fuel cell. The external humidifier disadvantageously occupies additional space and requires additional power supply to a heater provided therein for increasing the temperature and humidity of the reactant gas. However, the external humidifier also has many advantages, such as providing stable humidifying amount, capable of controlling and regulating humidifying amount, capable of handling a relatively large amount of gas humidifying, and easy to maintain and repair. Regarding the internal humidification, humidifying mechanisms are internally added to a fuel cell. The internal humidifying mechanisms have the advantages of having small volume without occupying too much space, omitting additional humidifier and heater to save the cost therefor, and directly utilizing recycled waste heat or water produced by the fuel cell itself. However, the internal humidifying mechanisms also have some drawbacks, such as involving complicate pipeline design and complicate connection to the fuel cell, uneasy to control and regulate the humidifying amount, uneasy to get saturated humidified gas when the load is high, and uneasy to maintain and repair.

In recent years, many reactant gas humidifying designs for fuel cell systems have been made or improved. U.S. Pat. Nos. 5,482,680 and 5,527,363 disclose a fuel cell stack having a humidifying section. This type of fuel cell stack has disadvantageously largely increased volume and weight, and the flow field design for the fuel, oxidizer, and water in the fuel cell stack is very complicate. U.S. Pat. No. 6,406,807 teaches the forming of water spray holes on ribs or lands between the gas passages on a carbon plate, so as to humidify the PEM directly. U.S. Pat. No. 6,403,249 discloses a battery with a membrane type humidifying section to directly humidify a reactant gas. U.S. Pat. No. 6,207,312 discloses a self-humidifying design, in which an interdigitated flow field and a membrane type humidifying section provided on a carbon plate are adopted. U.S. Pat. No. 6,066,408 teaches the addition of a wick in the gar flow field, and the use of water adding holes to supplement the water content of the wick. U.S. Pat. No. 5,998,054 discloses a humidifying design in which water is sprayed at a front end of every gas flow field on the carbon plate. U.S. Pat. No. 5,952,119 discloses a gas diffusion layer formed from a carbon fabric, on which hydrophilic fine threads are sewed at regular intervals, so that supplemented water is distributed over the PEM via the hydrophilic fine threads. And, U.S. Pat. No. 5,965,288 teaches an external water-permeable membrane humidifier to humidify a reactant gas.

SUMMARY OF THE INVENTION

A primary object of the present invention is to provide an external gas humidifier for fuel cell capable of increasing the moisture content of a reactant gas within a shortened time, and thereby enables a polymeric membrane in the fuel cell to be well humidified to enhance the power generation efficiency and service life of a PEMFC.

To achieve the above and other objects, the external gas humidifier for fuel cell according to a preferred embodiment of the present invention includes a barrel, a preheating serpentine, and a gas disperser. The gas disperser isolates a humidifying liquid in the barrel from a gas chamber formed in the barrel below the gas disperser. The preheating serpentine has a coiled section immersed in the humidifying liquid in the barrel, and an outlet located in the gas chamber. When a reactant gas is guided into the preheating serpentine, the reactant gas and the humidifying liquid exchange heat at the coiled section of the preheating serpentine. The heated reactant gas enters into the gas chamber via the outlet of the preheating serpentine, and leaves the gas chamber via the gas disperser in the form of tiny bubbles, which enter into the humidifying liquid above the gas disperser to increase the temperature and humidity of the reactant gas. Meanwhile, high-temperature waste heat produced by the fuel cell in the electrochemical reaction is recycled, and the waste heat is transferred via the humidifying liquid in the barrel to the reactant gas to reduce power consumption needed to heat the humidifying liquid. The large amount of tiny bubbles of the reactant gas entering into the humidifying liquid largely increase a contact area between the reactant gas and the humidifying liquid, and the retention time of the reactant gas in the humidifying liquid, and accordingly enhance the effect of humidifying the reactant gas.

On the other hand, at least one gas baffle plate is provided in the barrel in front of a gas outlet to reduce a dew point of the reactant gas, so that super-saturated water and gas molecules are collected and condensed to prevent flooding in the fuel cell caused by such super-saturated moisture and gas.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
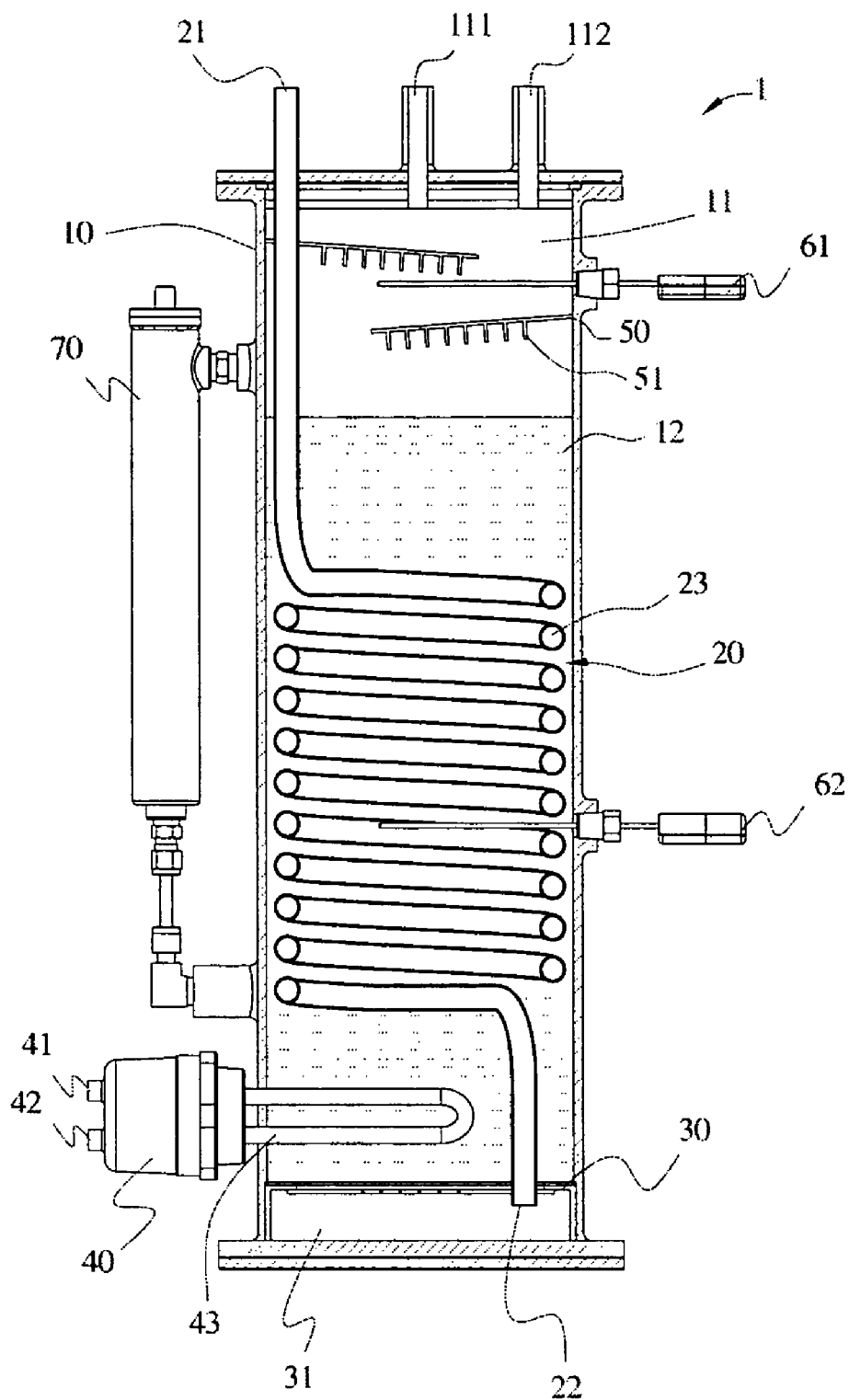
FIG. 1 is a schematic view of an external gas humidifier for fuel cell according to a preferred embodiment of the present invention.

Please refer to FIG. 1 that is a schematic view of an external gas humidifier for fuel cell 1 according to a preferred embodiment of the present invention. For the purpose of simplicity, the external gas humidifier for fuel cell 1 is also briefly referred to as the gas humidifier 1 throughout the specification, the abstract, and the appended claims. The gas humidifier 1 of the present invention is mainly used to heat and humidify a reactant gas for a fuel cell (not shown). The reactant gas may be hydrogen ($H_2$) or air. A fuel cell mainly consists of a proton exchange membrane (PEM), a catalyst layer, a gas diffusion layer (GDL), and a bipolar plate. When a proton exchange membrane fuel cell (PEMFC) operates, an oxidation reaction of hydrogen ($H_2$) occurs at the anode while a reduction reaction of oxygen ($O_2$) occurs at the cathode. First, the reactant gas is catalyzed by a catalyst, so that hydrogen is decomposed into hydrogen ions ($H^+$) and electrons ($e^-$), as indicated by the following chemical formula: $H_2 \rightarrow 2H^+ + 2e^-$. Electrons ($e^-$) flow from the anode to a circuit outside the cell to work against a load before flow to the cathode. Meanwhile, hydrogen ions ($H^+$) pass through the proton exchange membrane to move from the anode to the cathode, and combine with oxygen molecules ($O_2$) and electrons ($e^-$) to produce water ($H_2O$) and heat, as indicated by the following chemical formula: $\frac{1}{2}O_2 + 2H^+ + 2e^- \rightarrow H_2O$ +heat. When the hydrogen ions ($H^+$) are produced at the anode, a potential drop exists in the cell to cause the hydrogen ions to continuously move toward the cathode due to ion conducting. When the hydrogen ions ($H^+$) move due to ion conducting, they must be accompanied by several water molecules. That is, the hydrogen ions move in the form of hydrated ion, as indicated by the following chemical formula: $H^+(H_2O)_n$. Therefore, water molecules would continuously move toward the cathode when the fuel cell operates. At this point, water must be properly supplemented to avoid an overly dried PEM, which would reduce the ability of hydrogen ions conducting and result in largely reduced power generating performance of the PEMFC.

As shown in FIG. 1, the external gas humidifier 1 includes a barrel 10, a preheating serpentine 20, a gas disperser 30, a heat exchanger 40, and a set of gas baffle plates 50. The barrel 10 is a vertical cylindrical water tank defining an inner receiving space 11 for storing a humidifying liquid 12 therein. The receiving space 11 maybe externally provided with a heat-insulating layer to prevent leakage of heat of the humidifying liquid 12 from the barrel 10. A liquid level controller 70 and thermocouple thermometers 61, 62 may be connected to the barrel 10 at predetermined positions. The liquid level controller 70 is mainly used to control and regulate a volume of humidifying liquid 12 in the barrel 10, so that a level of the humidifying liquid 12 in the barrel 10 is always maintained at a predetermined height. Basically, the liquid level is preferably higher enough to immerse a coiled section 23 of the preheating serpentine 20. The thermocouple thermometers 61, 62 are mainly used to control and indicate a temperature of the humidifying liquid 12. The barrel 10 is provided at a top with a liquid water inlet 111 and a gas outlet 112. The humidifying liquid 12 is supplemented via the liquid water inlet 111.

The preheating serpentine 20 includes an inlet 21, an outlet 22, and a middle coiled section 23 between the inlet 21 and the outlet 22. With the continuously wound coiled section 23 immersed in the humidifying liquid 12, the preheating serpentine 20 has an increased contact surface with the humidifying liquid 12 to obtain an enhanced heat exchange effect.

The gas disperser 30 is located in the barrel 10 near a bottom thereof, so that a gas chamber 31 is formed in the barrel 10 below the gas disperser 30, and the humidifying liquid 12 in the receiving space 11 is isolated from the gas chamber 31. The outlet 22 of the preheating serpentine 20 is located in the gas chamber 31. The gas disperser 30 is of a porous plate structure having a very small pore size less than about 0.1 mm. The porous plate structure may be a foamed metal, a porous metal oxide, a porous carbon material, etc.

The set of gas baffle plates 50 includes at least one baffle plate, which has a plurality of fins 51 provided thereon and is downward inclined at a predetermined angle.

When the reactant gas, which is hydrogen ($H_2$) or air, is guided into the external gas humidifier 1 via the inlet 21 of the preheating serpentine 20 to flow through the coiled section 23, which is completely immersed in the humidifying liquid 12 filled in the inner receiving space 11 of the barrel 10, heat exchange occurs at the coiled section 23 between the reactant gas and the humidifying liquid 12, so that the reactant gas has a raised temperature. High-temperature waste heat produced in the reaction of the fuel cell may be recycled for use as a heat source for heating the humidifying liquid 12. The waste heat is guided into the heat exchanger 40 via a waste heat inlet 41, and then flows through a heat exchange tube 43 of the heat exchanger 40 to exchange heat with the humidifying liquid 12 and thereby increase the temperature of the humidifying liquid 12. The waste heat finally exits the heat exchanger 40 via a waste heat outlet 42 thereof. The heat exchange tube 43 may be a flat tube, a serpentine tube, or any other suitable configurations.

Thereafter, the reactant gas flows through the coiled section 23 and enters the gas chamber 31 via the outlet 22 of the preheating serpentine 20. Since the gas disperser 30 is made of a porous material, when the reactant gas passes through the gas disperser 30, a large amount of tiny bubbles are produced to enter into the humidifying liquid 12. These tiny bubbles largely increase the contact surface of the reactant gas with the humidifying liquid 12, and the retention time of the reactant gas in the humidifying liquid 12. In this manner, the reactant gas is fully and effectively humidified, making it easy for the reactant gas to become fully saturated. Before the reactant gas fully humidified with water leaves the barrel 10 via the gas outlet 112, it would first be intercepted by the set of gas baffle plates 50. The fins 51 provided on the surfaces of the gas baffle plates 50 function to reduce a dew point of the reactant gas, so that water molecules in the reactant gas are collected and condensed, preventing any super-saturated reactant gas from entering into the fuel cell. It is known that a super-saturated gas tends to condense into liquid water and would cause flooding in the fuel cell to largely reduce the power generating efficiency of the fuel cell. With the above arrangements, the reactant gas may be effectively humidified and heated within a shortened time before entering into the fuel cell.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An external gas humidifier for fuel cell, said fuel cell being supplied with a reactant gas to generate power and discharge high-temperature waste heat through an electrochemical reaction therein; said external gas humidifier comprising:
 a barrel for storing a humidifying liquid therein, and being provided at a top with a gas outlet;
 a preheating serpentine mounted in said barrel, and having an outlet, an inlet, and a middle coiled section between said outlet and said inlet; said reactant gas being guided into said barrel via said inlet of said preheating serpentine, and said coiled section being immersed in said humidifying liquid stored in said barrel; and
 a gas disperser provided in said barrel near a bottom thereof, so that a gas chamber is formed in said barrel below said gas disperser, and said humidifying liquid is isolated from said gas chamber by said gas disperser;
 wherein said outlet of said preheating serpentine is located in said gas chamber, so that said reactant gas is guided into said gas chamber via said outlet and enters into said humidifying liquid via said gas disperser in the form of tiny bubbles, and said tiny bubbles then leave said barrel via said gas outlet.

2. The external gas humidifier for fuel cell as claimed in claim 1, further comprising a heat exchanger mounted to said barrel at a predetermined position for guiding said waste heat discharged by said fuel cell to exchange heat with said humidifying liquid in said barrel, so as to raise a temperature of said humidifying liquid.

3. The external gas humidifier for fuel cell as claimed in claim 1, further comprising at least one thermocouple thermometer mounted to said barrel to contact with said humidifying liquid in said barrel for controlling and indicating a temperature of said humidifying liquid.

4. The external gas humidifier for fuel cell as claimed in claim 1, wherein said gas disperser is made of a porous material.

5. The external gas humidifier for fuel cell as claimed in claim 4, wherein said porous material is selected from the group consisting of foamed metals, porous metal oxides, and porous carbon materials.

6. The external gas humidifier for fuel cell as claimed in claim 1, further comprising at least one gas baffle plate mounted in said barrel in front of said gas outlet for intercepting said reactant gas, so that super-saturated moisture condenses on said gas baffle plate.

7. The external gas humidifier for fuel cell as claimed in claim 6, wherein said gas baffle plate is provided with a plurality of fins.

8. The external gas humidifier for fuel cell as claimed in claim 6, wherein said gas baffle plate is downward inclined at a predetermined angle.

* * * * *